March 10, 1970 C. K. N. PATEL 3,500,235
Q-SWITCHED MOLECULAR LASER
Filed Sept. 22, 1966 2 Sheets-Sheet 1

INVENTOR
C. K. N. PATEL
BY
*Wilford L. Wiener*
ATTORNEY

BEFORE Q-SWITCH

AFTER Q-SWITCH

BEFORE Q-SWITCH

AFTER Q-SWITCH 3,500,235
Q-SWITCHED MOLECULAR LASER
Chandra K. N. Patel, Chatham, N.J., assignor to Bell Telephone Laboratories, Incorporated, Murray Hill, N.J., a corporation of New York
Filed Sept. 22, 1966, Ser. No. 581,312
Int. Cl. H01s 3/09, 3/11, 3/22
U.S. Cl. 331—94.5           1 Claim

ABSTRACT OF THE DISCLOSURE

A pulsed single-frequency molecular laser is disclosed in which an increased rate of pulsing is provided by modulating the loss of the resonator with a period of the order of the thermalizing constant of the rotational energy levels of the molecular medium.

---

Figure 1:
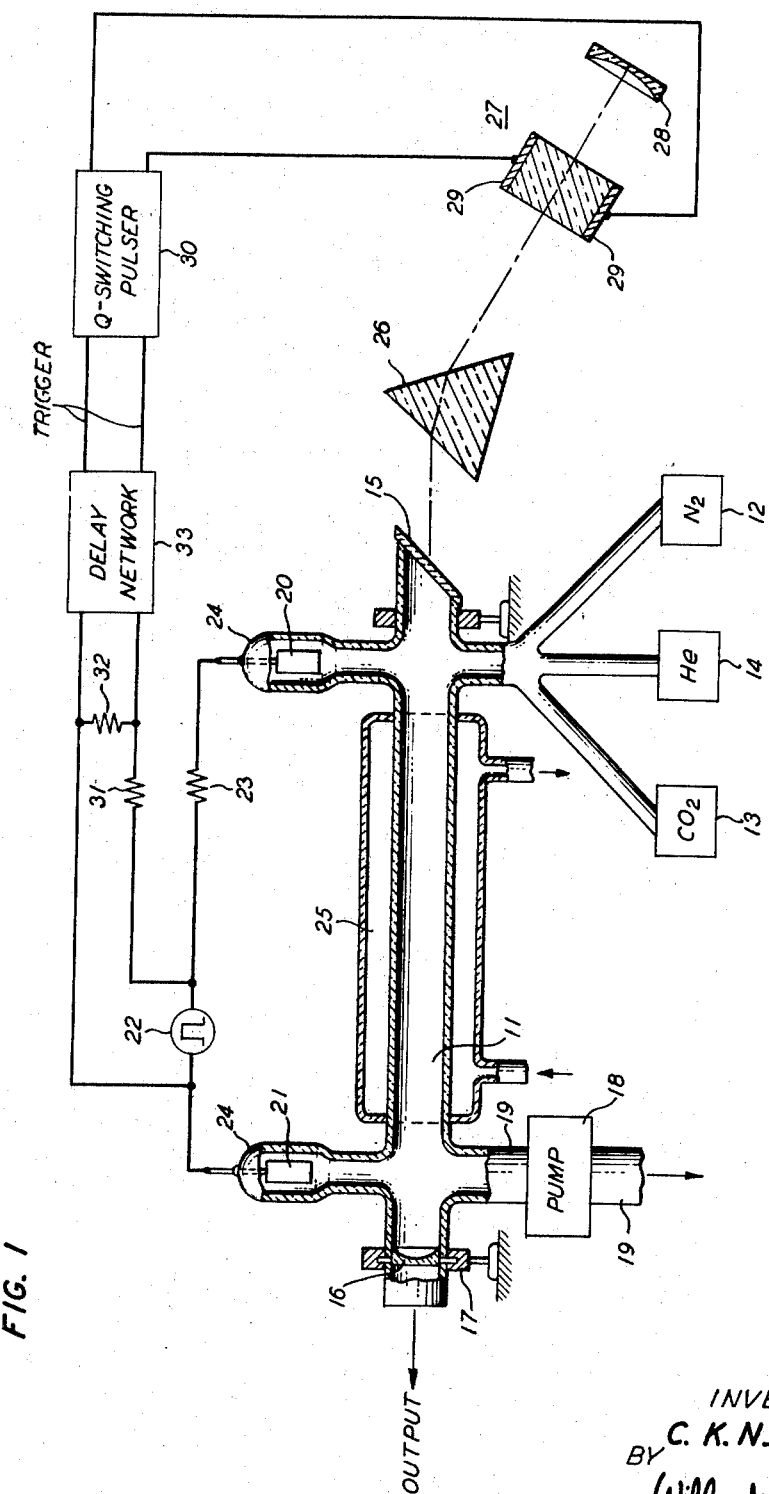

This invention relates to pulse generation in lasers, particularly in molecular gas lasers.

One common form of pulse generation in solid state lasers is known as Q-switching and involves a perturbation of a condition of the resonant cavity such that the cavity Q, or resonating capability, suddenly increases at the moment a pulse is to be initiated. This form of pulse generation typically requires a lifetime of members of the upper laser level sufficiently long, i.e., $1 \times 10^{-5}$ seconds or longer, that useful amounts of energy can be added to and stored in the laser medium during that lifetime.

Because many of the well-known gas lasers employing atomic transitions have lifetimes of the upper laser level of the order of $1 \times 10^{-7}$ seconds, Q-switching of a gas laser did not appear to be useful until very recently. It is now known that the lifetimes of the upper laser levels in molecular lasers, such as carbon dioxide laser operating upon a vibrational-rotational transition, are long enough to permit effective Q-switching.

An example of the proposals that take advantage of this fact is the Q-switched molecular laser disclosed in the copending application of T. J. Bridges, Ser. No. 566,892 filed July 21, 1966 and assigned to the assignee hereof. That arrangement provides a pulse period not greatly different from the lifetime of the lower laser level, so that a more rapid rate of pulsing is provided than in previous proposals for Q-switching gas lasers.

For many applications, a more rapid rate of pulsing is desirable. For example, the information-carrying capacity of an optical pulse code modulation system is ordinarily limited by the rate at which pulsing of the laser radiation can be accomplished.

According to my invention, suitably rapid Q-switching repetition rates can be obtained, with the aid of a frequency-discriminating element in the optical resonator, by modulating the loss of the resonator with a period of the order of magnitude of the thermalizing time constant of the rotational energy levels within the vibrational energy level that includes the upper laser level. In a preferred embodiment, the pumping power is pulsed just before optimum resonance conditions are provided for each Q-switched pulse.

Further features and advantages of my invention will become apparent from the following detailed description, taken in conjunction with the drawing, in which:

FIG. 1 is partially a pictorial side elevation and partially a schematic illustration of a preferred embodiment of the invention; and FIGS. 2A, 2B, 2C, and 2D show curves that are useful in understanding the theory and operation of the invention.

In the embodiment of FIG. 1, there is shown a carbon dioxide laser Q-switched according to my invention. The laser comprises a glass tube 11, which contains a gaseous mixture of nitrogen supplied from a source 12, carbon dioxide supplied from a source 13, and helium supplied from a source 14. The tube 11 is closed at its right-hand end by the Brewster-angle plate 15 of potassium chloride, which is transparent at the laser wavelength of 10.6 microns, and is closed at its left-hand end by the partially-transmissive mirror 16, which is mounted in a suitable mirror mount 17. A continuous flow of the gas mixture through the tube 11 is maintained by the pump 18, which is located in the outlet port 19 of the tube 11.

Excitation, or pumping energy, is supplied to the gaseous mixture by a pulsed electrical discharge between the cold cathode 20 and the anode 21, powered by a pulsed direct-current source 22 through a current-limiting resistance 23. The cathode 20 and the anode 21 are disposed in bulbous appendages 24 of the tube 11.

Excess heat is removed from the laser tube by continuously flowing a coolant, such as water, from a source (not shown) through a jacket 25 surrounding the laser tube.

The prism 26, the Q-switching shutter 27 and the mirror 28 are disposed beyond the Brewster-angle plate 15 to form an optical resonator with respect to the fixed mirror 16. The Q-switching shutter 27 is driven, at a rate exceeding $1 \times 10^{-5}$ cycles per second and preferably approaching $1 \times 10^{-7}$ cycles per second, through the electrodes 29 by the Q-switching pulser 30 connected thereto. In the preferred embodiment in which the source 22 is also a pulsed source, the pulser 30 is triggered by a signal from the source 22 through a voltage-dividing network 31 and 32 and a delay network 33 connected in tandem between source 22 and a trigger input of pulser 30.

The tube 11 illustratively has a bore of 10 millimeters and provides an effective discharge length of 100 centimeters along its axis. Nevertheless, the tube 11 can be of any known type so long as the Brewster-angle plate 15 is substantially transparent to the laser radiation.

Illustratively, the gas mixture within the tube 11 comprises carbon dioxide at a pressure of about 2 torr, nitrogen at a pressure of about 3 torr, and helium at a pressure of about 15 torr. The relative proportions and pressures of these components can vary over wide ranges for the case in which carbon dioxide is the lasing gas and has a pressure lying between 0.1 torr and 5.0 torr. The other, auxiliary, gases are desirable especially with the higher pressures of carbon dioxide. It is noted that the gases present and their pressures and proportions will affect the thermalizing time constant to some extent. It is further noted that the lasing gas could be some other suitable molecular gas, such as $N_2O$.

Illustratively, excitation or pump power is supplied from source 22 at a current of several amperes and at a voltage of about 20 kilovolts between electrodes 20 and 21. The exact values depend on tube size and, for any given tube, can vary through a considerable range. The source 22 could also be a direct-current source, in which case the pulser 30 would be free-running.

The reflectors 16 and 28 that form the optical resonator are preferably spaced near-confocally, although a near-concentric or other arrangement could be employed. For 10.6 micron laser radiation, the reflector 28 is typically coated with vacuum-deposited gold to be opaque; and the reflector 16 is dielectric coated, by techniques now well-known in the laser art, to be about 50 percent reflective and 49 percent transmissive to couple the output radiation from the laser.

Although an arrangement is shown that employs continuous flow of the gas mixture, a static gas mixture could also be employed.

The prism 26 is illustratively potassium chloride and in any case is sufficiently dispersive to discriminate effectively between the various laser lines in carbon dioxide, which are closely spaced around a wavelength of 10.6 microns. Effective discrimination occurs when prism 26 directs all but one of the laser radiations corresponding to different transitions at a sufficient angle with respect to the laser axis as these radiations leave the prism that they cannot oscillate.

The electro-optic shutter 27 illustratively comprises a crystal of gallium arsenide to which the electrodes 29 are applied by vacuum deposition. The combination of the crystal and the electrodes forms an electro-optic modulator; and the polarizing and analyzing functions needed for a shutter are provided by the Brewster-angle plate 15 or may be separately provided.

The voltage-dividing network 30 and 31 and delay network 33 transmit an appropriate portion of the voltage from source 22 to pulser 30 at an appropriate time. Specifically, the resistors 31 and 32 form a relatively high impedance voltage divider, as compared to the load represented by the laser medium and resistor 23 in series; and the delay of network 33 is selected to be nearly equal to the time in seconds between the application of peak power to the gas mixture and the subsequent occurrence of peak population inversion in the gas mixture. This time difference enables optimum resonating conditions of the resonator to coincide with peak population inversion between the upper and lower laser energy levels of the carbon dioxide. Its value may be substantial in relation to the pulse period, but can be determined experimentally. The delay network 33 can be adjustable to provide control over the synchronization.

The theory and operation of the invention will now be explained with reference to FIGS. 2A–2D.

First, assume that the Q of the optical resonator is switched, or driven by source 22, through an entire cycle of variation at a rate of $1 \times 10^7$ times per second. This frequency is the reciprocal of the approximate thermalizing time constant for the carbon dioxide rotational energy levels of interest. Although the remarks that follow are directed specifically to this frequency of pulsing provided by source 22, they are applicable with only a quantitative modification of effect to lower frequencies at which an advantage can still be obtained over prior techniques.

In the FIGS. 2A–2D, each curve segment 41, 41', 51 and 51' represents the gain of a particular rotational energy level transition that is potentially a laser transition versus the angular momentum that identifies the upper rotational energy level of the transition. The gains are directly related to the population differences of the upper and lower energy levels for each transition. It is seen that both the gains and the population differences assume some characteristic distribution, dependent on the excitation provided by source 22.

Figure 2A:
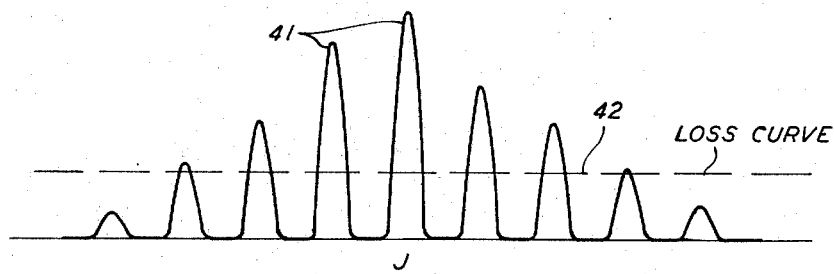

In FIG. 2A, the horizontal dashed curve 42 represents the loss of the laser of FIG. 1 in the absence of the prism 26. It may seem that several transitions have sufficient gain to oscillate; that is, for these transitions, the gain exceeds the loss.

Figure 2B:
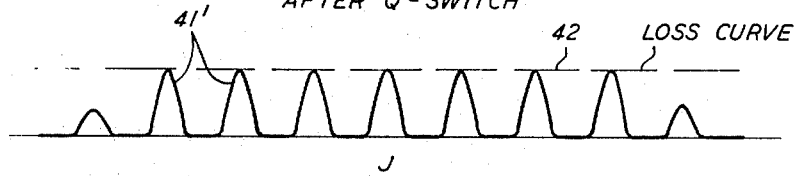

FIG. 2B illustrates the condition that would prevail after the first Q-switched pulse if the frequency-selective prism 26 were not present in the resonator. The population differences for upper and lower levels of each oscillating transition would be reduced to the level where the gain just equals the loss. No thermalizing energy transfer can occur between rotational energy levels during the active generation of each pulse; and thus no competition between transitions can occur. A consequence is that no natural selectivity among transitions is present. That is, no one transition can oscillate to the exclusion of others, unlike the cooperation described in the above-cited copending patent application of T. J. Bridges. The most undesirable result of the situation of FIG. 2B is that the active medium cannot recover sufficiently to generate the next pulse at the rate of interest.

Thermalizing energy transfer results from particle collisions that tend to redistribute the energy of the colliding particles and thus to give a Boltzmann distribution of population among the affected rotational energy levels. The decrease of thermalizing energy transfer and the accompanying disappearance of competition between transitions as the Q-switching frequency increases partially accounts for the fact that the arrangement proposed by Bridges is feasible within a limited frequency range.

Figure 2C:
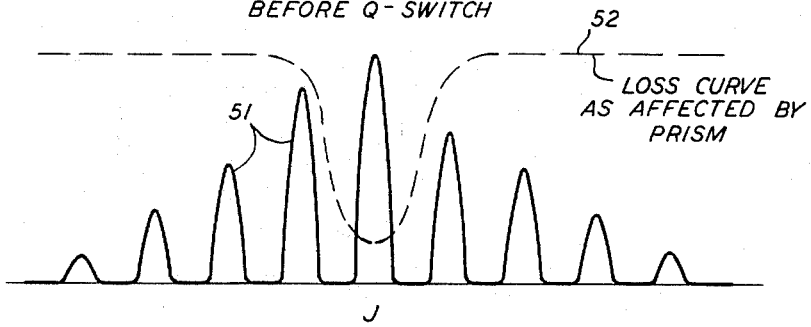
Figure 2D:
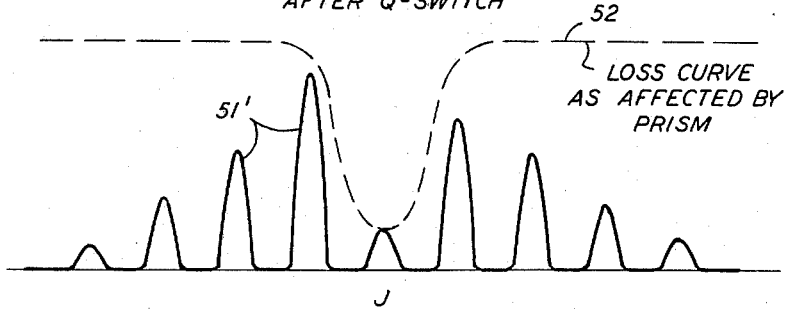

The frequency-selective prism 26 in the embodiment of FIG. 1 prevents the result depicted in FIG. 2B. Instead, the sequence of events in the preferred embodiment of FIG. 1 occurs as shown in FIGS. 2C and 2D. The prism 26 preferably increases the loss of the resonator for all transitions except one, as shown by curve 52 of FIG. 2C. At the termination of the Q-switched pulse, only the population difference associated with this one oscillating transition has been decreased substantially.

Although no sizeable thermalizing energy transfer occurred during the relatively brief active generation of each pulse, a substantial amount of thermalizing energy transfer occurs between pulses because the latter time interval is long relative to the duration of each pulse and is comparable to the thermalizing time constant. Thus, a distribution approximating the original distribution of population differences and gains is restored for the respective transitions. Consequently, subsequent pulses can be generated at the desired rate. As stated hereinbefore the pulse repetition frequency can be as high as approximately $1 \times 10^7$ per second, or approximately the reciprocal of the thermalizing time constant.

It may be noted that at the frequencies of most interest for this invention, that is, for frequencies of $1 \times 10^5$ cycles per second to $1 \times 10^7$ cycles per second, the electric discharge in the gas mixture will not be completely extinguished between pulses; but the power in the discharge will vary sufficiently to produce the synchronization effect that is preferred in the use of the present invention, at least for the lower frequencies of interest. That is, maximum population inversion of the desired transition occurs substantially simultaneously with optimum resonating conditions of the optical resonator.

The operation of the electro-optic shutter 27 is conventional, with the possible exception of the fact that both the polarizing and analyzing of light before and after it is transmitted through the electro-optic crystal are provided by the Brewster-angle plate 15. The light makes two passes through the crystal after polarization before it is analyzed.

The above-described arrangements are illustrative of a small number of the many possible specific embodiments that can represent applications of the principles of the invention. Numerous and varied other arrangements can readily be devised in accordance with these principles by those skilled in the art without departing from the spirit and scope of the invention.

What is claimed is:

1. A pulsed laser comprising means forming an active region including a molecular gas capable of lasing action on transitions between rotational energy levels thereof, means for supplying pump energy to said gas to promote said lasing action, means for resonating energy produced by said lasing action, said resonating means including means for selecting a single frequency for said lasing action, and means for modulating the loss of said resonating means periodically to have a period lying in the range from a period substantially equal to the thermalizing time constant of rotational energy levels within the vibrational energy levels that includes the upper laser level of said molecular gas to a period approximately two orders of magnitude longer.

References Cited

UNITED STATES PATENTS

| | | | |
|---|---|---|---|
| 3,243,724 | 3/1966 | Vuylsteke | 331—94.5 |
| 3,369,101 | 2/1968 | Di Curcio | 331—94.5 X |
| 3,388,314 | 6/1968 | Gould | 331—94.5 X |

OTHER REFERENCES

Masters, More Power to the Laser—With Q Switching, Electronics, Oct. 18, 1965, pp. 91–95, 331–94.5.

Patel, Selective Excitation Through Vibrational Energy Transfer and Optical Maser Action in $N_2$—$CO_2$, Physical Review Letters, Nov. 23, 1964, pp. 617–619, 331–94.5.

NATHAN KAUFMAN, Primary Examiner

S. H. GRIMM, Assistant Examiner

U.S. Cl. X.R.

350—160